United States Patent
Huang et al.

(10) Patent No.: US 10,803,905 B2
(45) Date of Patent: Oct. 13, 2020

(54) VIDEO PROCESSING APPARATUS, VIDEO PROCESSING METHOD THEREOF AND NON-TRANSITORY COMPUTER READABLE MEDIUM

(71) Applicant: Acer Incorporated, New Taipei (TW)

(72) Inventors: Chih-Wen Huang, New Taipei (TW); Chao-Kuang Yang, New Taipei (TW)

(73) Assignee: Acer Incorporated, New Taipei (TW)

( * ) Notice: Subject to any disclaimer, the term of this patent is extended or adjusted under 35 U.S.C. 154(b) by 188 days.

(21) Appl. No.: 16/053,831

(22) Filed: Aug. 3, 2018

(65) Prior Publication Data

US 2019/0362756 A1 Nov. 28, 2019

(30) Foreign Application Priority Data

May 23, 2018 (TW) .............................. 107117600 A

(51) Int. Cl.
*G11B 27/031* (2006.01)
*H04N 21/85* (2011.01)
*H04N 21/218* (2011.01)

(52) U.S. Cl.
CPC ......... *G11B 27/031* (2013.01); *H04N 21/218* (2013.01); *H04N 21/85* (2013.01)

(58) Field of Classification Search
CPC ............... G11B 27/031; H04N 21/218; H04N 21/21805; H04N 21/234309; H04N 21/234363; H04N 21/42202; H04N 21/4728; H04N 21/6587; H04N 21/85
See application file for complete search history.

(56) References Cited

U.S. PATENT DOCUMENTS

| | | | | |
|---|---|---|---|---|
| 10,334,162 | B2 * | 6/2019 | Seo | ........................... G06T 7/11 |
| 2016/0088285 | A1 * | 3/2016 | Sadi | ...................... G03B 37/04 |
| | | | | 348/43 |
| 2017/0110150 | A1 * | 4/2017 | Cave, Jr. | .............. G11B 27/005 |
| 2018/0007339 | A1 * | 1/2018 | Castleman | ........... H04L 65/602 |
| 2018/0063513 | A1 * | 3/2018 | Bar | ......................... G06T 7/269 |
| 2018/0324410 | A1 * | 11/2018 | Roine | ................ H04N 5/23238 |

FOREIGN PATENT DOCUMENTS

| | | |
|---|---|---|
| CN | 105809626 | 7/2016 |
| CN | 106161989 | 11/2016 |
| CN | 107623804 | 1/2018 |

OTHER PUBLICATIONS

"Panoramic video stitching from commodity HDTV cameras" Springer-Verlag Berlin Heidelberg Apr. 2013 (Xu et al.).*

* cited by examiner

*Primary Examiner* — Mohammed S Rahaman
(74) *Attorney, Agent, or Firm* — JCIPRNET

(57) ABSTRACT

A video processing apparatus, a video processing method thereof and a non-transitory computer readable medium are provided. In the method, at least two original video files are obtained, where each original video file is recorded in different shoot direction. Each video frame of the original video file is stitched, to generate multiple stitched video frame. In response to generating each stitched video frame, each stitched video frame is provided for use of playback directly without encoding those stitched video frame into a video file. Accordingly, a real-time and smooth playback effect is achieved.

5 Claims, 2 Drawing Sheets

VIDEO PROCESSING APPARATUS, VIDEO PROCESSING METHOD THEREOF AND NON-TRANSITORY COMPUTER READABLE MEDIUM

CROSS-REFERENCE TO RELATED APPLICATION

This application claims the priority benefit of Taiwan application serial no. 107117600, filed on May 23, 2018. The entirety of the above-mentioned patent application is hereby incorporated by reference herein and made a part of this specification.

BACKGROUND OF THE DISCLOSURE

1. Field of the Disclosure

The present disclosure relates to a video processing technology, and in particular to a video processing apparatus, a video processing method thereof and a non-transitory computer readable medium.

2. Description of Related Art

Nowadays, 360-degree videos and panorama cameras are more and more popular. Users not only can watch the 360-degree videos through a computer screen but also can watch the 360-degree videos on a virtual reality (VR) head-mount display (HMD) to achieve a further immersive effect. In the conventional technology, a common video player program for playing non-panoramic videos (such as videos in a degree less than 180 degrees) generally can smoothly play videos with 4K resolution and further high resolution. However, most of existing cameras and video players only support videos with resolution equal to or less than 4K. For the VR HMD, the 4K resolution is not enough. For example, if two images displayed to left and right eyes have the resolution of 1,440×1,440 (1.4K) respectively, the resolution of the video at least needs to be 5,760×2,880 (5.7K) to get enough clear for a user. On the other hand, when a panorama camera capable of generating two video files with the resolution of 1.4 K is used, it can be discovered that operation procedures for videos with 5.7 K resolution are not friendly in the conventional technology. In addition, in order to generate 360-degree video files, original video files generated by the panorama camera in different shoot directions can be processed in ways of decoding, de-warp, 360-degree stitching, encoding and the like. The foregoing process of videos will consume a large number of hardware resources and processing time, so that subsequent video playback in a VR technology is not smooth enough (less than 30 frames per second (FPS)). Although some panorama cameras may have a frame stitching technology, a back-end computer still needs to decode the 360-degree video files at first through a playback program, then the videos files can be played on the display, and the problem that the videos cannot be played smoothly enough still exists.

SUMMARY OF THE DISCLOSURE

Accordingly, the present disclosure provides a video processing apparatus, a video processing method thereof and a non-transitory computer readable medium, stitched video frames can be played directly, processing time is greatly shortened, and furthermore, high-resolution stitched videos can be played more smoothly.

The video processing method of the present disclosure includes the following steps. At least two original video files is obtained, where each original video is recorded in different shoot directions. Each video frame of those original video files is stitched, to generate multiple stitched video frames. In response to generating each stitched video frame, each stitched video frame is provided for use of playback directly without encoding those stitched video frames into a video file.

The video processing apparatus of the present disclosure includes a memory and a processor. The memory records at least two original video files and multiple modules. The processor is coupled with the memory, and stores and loads those modules recorded in the memory. Those modules include a video stitching module and a frame bridge module. The video stitching module obtains those original video files, and each original video file is recorded in different shoot directions. Each video frame of those original video files is stitched, to generate multiple stitched video frames. In response to generating each stitched video frame, each stitched video frame is provided for use of playback directly by the frame bridge module without encoding those stitched video frames into a video file.

The non-transitory computer readable medium of the present disclosure stores commands configured to be executed by an apparatus to perform the following steps. At least two original video files is obtained, where each original video is recorded in different shoot directions. Each video frame of those original video files is stitched, to generate multiple stitched video frames. In response to generating each stitched video frame, each stitched video frame is provided for use.

Base on the above, by the video processing apparatus, the video processing method thereof and the non-transitory computer readable medium of an embodiment of the present disclosure, the stitched video frames are provided for a display for use of playback directly without encoding those stitched video frames into a video file. Therefore, processing time for subsequent decode of video file is saved, and smoothness of playback of high-resolution videos is improved.

To make the above features and advantages of the disclosure more comprehensible, several embodiments accompanied with drawings are described in detail as follows.

DESCRIPTION OF THE EMBODIMENTS

Figure 1:
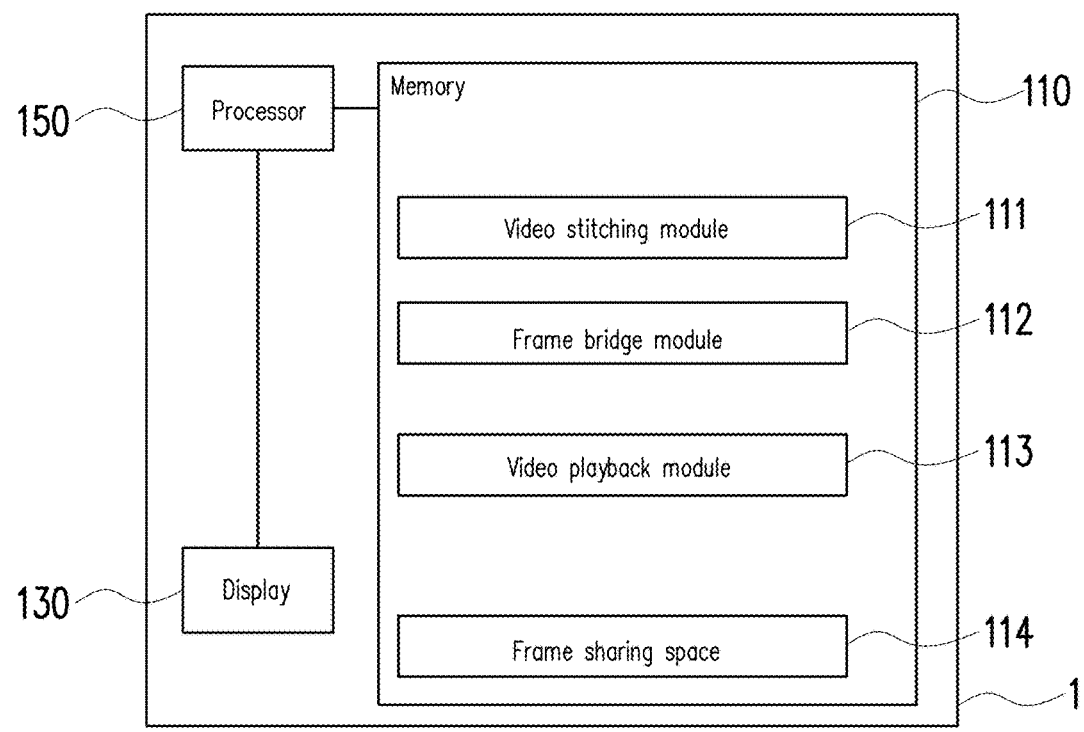
FIG. 1 is a block diagram illustrating a video processing apparatus according to an embodiment of the present disclosure.

FIG. 1 is a block diagram illustrating a video processing apparatus 1 according to an embodiment of the present disclosure. Referring to FIG. 1, the video processing apparatus 1 at least includes but not limited to a memory 110, a display 130 and a processor 150. The video processing apparatus 1 can be computer systems in various types (such as a desktop computer, a notebook computer, a smart phone and a tablet computer), or a head-mount display (HMD).

The memory 110 can be a fixed or movable random access memory (RAM) in any types, a read-only memory (ROM), a flash memory or a memory of a combination of similar elements or the foregoing elements. The memory 110 is used for storing buffered or permanent data, software modules (such as a video stitching module 111, a frame bridge module 112 and a video playback module 113), frame sharing space 114, original video files, stitched video frames and the like, and detailed contents are explained in the following embodiments.

The display 130 can be a display such as a liquid-crystal display (LCD), a light-emitting diode (LED) and an organic light-emitting diode (OLED) in various display technologies.

The processor 150 is coupled with the memory 110 and the display 130. The processor 150 can be a graphics processing unit (GPU), a central processing unit (CPU) or other microprocessors which are programmable and can be in a general purpose or a special purpose, a digital signal processor (DSP), a programmable controller, an application-specific integrated circuit (ASIC) or a combination of other similar elements or the foregoing elements. In the embodiment of the present disclosure, the processor 150 is used for performing all operations of the video processing apparatus 1, and can load and execute various software modules, files and data which are recorded in the memory 110.

In order to understand the operation process of the embodiment of the present disclosure, multiple embodiments are described to illustrate a processing procedure of the video processing apparatus 1 for original video files in the embodiment of the present disclosure in detail below. Hereinafter, the method of the embodiment of the present disclosure is illustrated below with reference to various elements and modules in the video processing apparatus 1. Various procedures of the method can be adjusted according to actual implementation situations, but the embodiments is not limited thereto.

Figure 2:
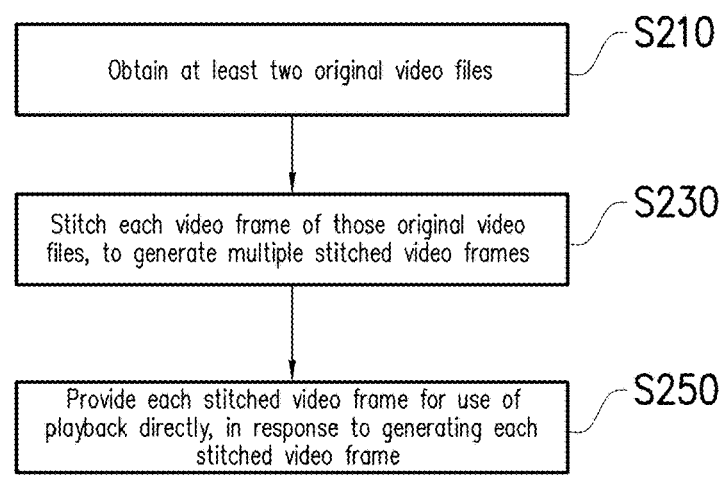
FIG. 2 is a flow chart of a video processing method according to an embodiment of the present disclosure.

FIG. 2 is a flow chart of a video processing method according to an embodiment of the present disclosure. Referring to FIG. 2, at least two original video files are obtained by capturing network packets, uploading of users, accessing from an external or built-in storage medium (such as a flash drive, an optical disk and an external hard drive). The original video files also can be recorded through an external or built-in image capturing device (such as a camera, a video recorder, etc.) directly. Then, the original video files are stored in the memory 110. It should be noticed that, each original video file is a video file recorded by one of multiple cameras toward different shoot directions. The video files, for example, are generated by encoding video frames on the basis of video encoding formats such as H.264, H.265 and VP9. For example, two 180-degree ultra-wide cameras in a panorama camera record videos in shoot directions facing away from each other, so as to generate two 180-degree original video files. Four 120-degree wide cameras shoot in shoot directions respectively forming included angle of 120 degrees with neighbouring shoot direction, so as to generate four 120-degree original video files. The video stitching module 111 then obtains at least two original video files recorded in different shoot directions simultaneously from the memory 110 (step S210).

In order to combine the original video files recorded in different shoot directions to generate wider-field displaying images, the video stitching module 111 stitches each video frame of those original video files, to generate multiple stitched video frames (step S230). Particularly, the video stitching module 111 decodes each original video file according to a corresponding video encoding format, so as to generate original video frames. Because lens of a video capturing device for recording the original video files may cause imaging warp deformation (distortion), the video stitching module 111 needs to perform de-warp processing on the original video frames (the step can be omitted if distortion of videos is not caused). Then, after de-warp of the video frames, the video stitching module 111 sequentially stitches video frames which are recorded at the same time, so as to generate stitched video frames which have wider fields than each original video frame.

It should be noticed that, the stitch operation of step S230 is initialled in response to a playback operation for those original video files (such as starting of the original video files through a video player program, clicking of the original video files, etc.), which is received by the video stitching module 111 through an inputting device (such as a touch screen, a mouse, a keyboard, and the likes). In response to the playback operation, the video stitching module 111 stitches each video frame of those original video files. In other words, when a user intends to play those original video files, the video stitching module 111 is required to stitch the video frames. In addition, according to actual demands, the video stitching module 111 may further apply image processing technologies (such as exposure correction, color correction, etc.) on each original video frame to improve a stitching effect, and the embodiment of the present disclosure is not limited thereto.

In response to generating each stitched video frame, the frame bridge module 112 provides each stitched video frame for use of playback directly (step S250) without encoding those stitched video frames into a video file. In the embodiment, along with generation of stitched video frames, the frame bridge module 112 temporarily stores each stitched video frame to the frame sharing space 114. The frame sharing space 114 may be a certain memory block in the memory 110. In response to storing the stitched video frames, the video playback module 113 obtains each stitched video frame from the frame sharing space 114, and each obtained stitched video frame is played through the display 130. It should be noticed that, the stitched video frames stored by the frame bride module 112 are subsequent to the stitched video frames played by the video playback module 113. In other words, the video stitching module 111 generates an $i^{th}$ stitched video frame and stores the $i^{th}$ stitched video frame to the frame sharing space 114 through the frame bride module 112, and the video playback module 113 obtains and plays a $j^{th}$ stitched video frame, so that the display 130 can play the complete stitched video frames, where i and j are positive integers, and i is greater than j. The video stitching module 111 sequentially obtains two single video frames recorded in different shoot directions and then stitches the single video frames in real time. Then, the stitched video frames are projected to the display 130 through the video playback module 113 (namely, the video frames at different times are cached/stored and obtained synchronously from the frame sharing space 114). Therefore, a real-time playback effect can be achieved in the embodiment of the present disclosure. Compared with the prior art, the embodiment of the present disclosure can save processing time of encoding and decoding of the stitched video frames. Accordingly, when the video processing apparatus 1 processes original video files with higher resolutions (such as 2.8 K and 4 K), the stitched video frames still can be played in real time.

It should be noticed that, in some embodiments, if the video stitching module 111 and the video playback module 113 are application programs of different operating systems (OS) or different platform versions, functions of some application programming interfaces (APIs) can be transformed to a target platform by taking the frame bridge module 112 as a bridge connection.

In addition, in order to provide a more smooth playback effect, in an embodiment, the video stitching module 111 temporarily stores at least k stitched video frames to the frame sharing space 114 every second, where k is a positive integer and related to frame rate of playback of the stitched video frames, and i is greater than or equal to k+j. For example, if the frame rate of playback of the stitched video frames is required to reach 30 FPS, the video playback module 113 plays a 7th stitched video frame, then the video stitching module 111 has to process a 37th stitched video frame. Therefore, the frame sharing space 114 stores 30 stitched video frames. It means that, the number of the stored stitched video frames is a reciprocal value of the frame rate. The remaining stitched video frames are processed in the similar way, and the frame rate can be adjusted according to actual demands.

Figure 3:
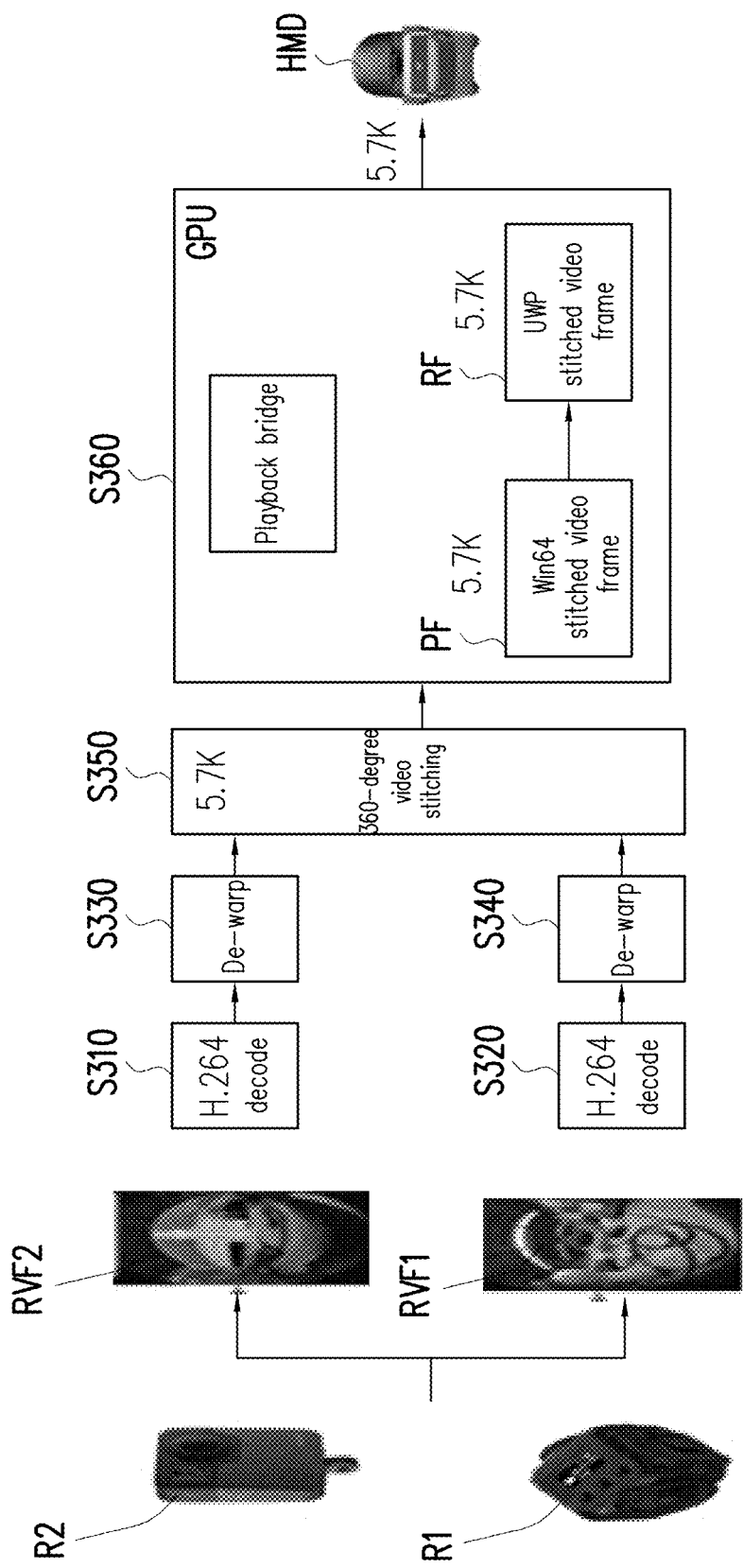
FIG. 3 is a flow chart illustrating a process of a video with the resolution of 5.7 K in an implement scenario.

In order to enable readers to comprehend the spirit of the present disclosure more deeply, another implement scenario is described below. FIG. 3 is a flow chart illustrating a process of a video with the resolution of 5.7 K in an implement scenario. Referring to FIG. 3, in order to improve processing efficiency, the processor 150 in the implement scenario is a GPU. Original video files RVF1 and RVF2 with 1.4 K resolution are respectively generated through recording by 180-degree cameras R1 and R2 in the panorama camera. In response to the playback operation for the original video files RVF1 and RVF2 by a user, the video stitching module 111 of the video processing apparatus 1 (assumed to be a head-mount display (HMD)) obtains the original video files RVF1 and RVF, respectively decodes the original video files RVF1 and RVF on the basis of the video encoding format of H.264 (steps S310 and S320), performs de-warp processing (steps S330 and S340), and then 360-degree-stitches two video frames at the same time to form stitched video frames with 5.7 K resolution (step S350). The frame bridge module 112 transmits the stitched video frames with 5.7 K resolution to a universal Windows platform (UWP) from a win64 (windows 64-bit) platform (step S360), so that the video playback module 113 can project the stitched video frames to the display 130 of the head-mount display (HMD), to play the stitched videos in real time. Then, the user can experience 360-degree videos with 5.7 K resolution under a VR situation. In steps S310-S360, GPU resources are used, therefore, in the implement scenario, the frame rate of video output can be increased to 30 FPS and even 60 FPS, but less CPU resources are occupied.

Another exemplary embodiment of the disclosure provides a non-transitory computer readable medium (such as a hard disc, a flexible disc, a flash drive, CD, etc.), the non-transitory computer readable medium is used for performing various steps of the video processing method (embodiments shown in FIG. 2 to FIG. 3). The non-transitory computer readable medium includes multiple program commands, and after the processor 150 of the video processing apparatus 1 loads and executes the program commands, the video processing method can be implemented, and functions of the video processing apparatus 1 are achieved.

Based on the foregoing, by the video processing apparatus, the video processing method thereof and the non-transitory computer readable medium of the present disclosure, the stitched video frames are not encoded into a video file, but are provided for use of playback. The processing time for encoding and decoding of the stitched video files is omitted. Therefore, the original video files with high resolution or ultra-high resolution can be processed, and a real-time playback effect is achieved. In addition, if the number of the stitched video frames stored in the frame sharing space is increased, videos can be played at high and smooth frame speed.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims and their equivalents.

What is claimed is:

1. A video processing method, comprising:
   obtaining at least two original video files, wherein each of the original video files is recorded in different shoot directions;
   stitching each video frame of the at least two original video files, to generate a plurality of stitched video frames; and
   providing each of the stitched video frames for use of playback directly without encoding the stitched video frames into a video file in response to generating each of the stitched video frames, comprising:
      sequentially storing the stitched video frames to a frame sharing space every second, wherein a number of the stitched video frames stored in the frame sharing space is a positive integer and related to frame rate of playback of the stitched video frames; and
      sequentially obtaining each of the stitched video frames from the frame sharing space and playing each of obtained stitched video frames based on an order of the stitched video frames in the frame sharing space in response to storing the stitched video frames, wherein
      playing a $j^{th}$ stitched video frame in response to generating an $i^{th}$ stitched video frame, wherein i and j are positive integers, i is greater than or equal to k+j, i is accumulated in response to a next stitched video frame being generated, and k is number of the stitched video frames stored in the frame sharing space.

2. The video processing method according to claim 1, wherein the step of stitching each video frame of the at least two original video files comprises:
   receiving a playback operation for the at least two original video files; and
   stitching each video frame of the at least two original video files in response to the playback operation.

3. A video processing apparatus, comprising:
   a display;
   a memory, storing at least two original video files, and comprising a frame sharing space; and
   a processor, coupled with the memory and the display, and configured for:
      obtaining the at least two original video files, wherein each of the original video files is recorded in different shoot directions;
      stitching each video frame of the at least two original video files, to generate a plurality of stitched video frames; and
      providing each of the stitched video frames for use of playback directly without encoding the stitched video frames into a video file in response to generating each of the stitched video frames, comprising:

sequentially storing the stitched video frames to the frame sharing space every second, wherein a number of the stitched video frames stored in the frame sharing space is a positive integer and related to frame rate of playback of the stitched video frames; and sequentially obtaining each of the stitched video frames from the frame sharing space and playing each of obtained stitched video frames through the display based on an order of the stitched video frames in the frame sharing space in response to storing the stitched video frames, wherein in response to generating an $i^{th}$ stitched video frame by the processor, a $j^{th}$ stitched video frame is played through the display, wherein i and j are positive integers, i is greater than or equal to k+j, i is accumulated in response to a next stitched video frame being generated, and k is number of the stitched video frames stored in the frame sharing space.

4. The video processing apparatus according to claim 3, wherein the processor receives playback operation for the at least two original video files, and in response to the playback operation, each video frame of the at least two original video files is stitched.

5. A non-transitory computer readable medium, which stores multiple commands configured to be executed by an apparatus to perform steps of:

obtaining at least two original video files, wherein each of the original video file is recorded in different shoot directions;

stitching each video frame of the at least two original video files, to generate a plurality of stitched video frames; and providing each of the stitched video frame for use of playback directly without encoding the stitched video frames into a video file in response to generating each of the stitched video frame, comprising:

sequentially storing the stitched video frames to a frame sharing space every second, wherein a number of the stitched video frames stored in the frame sharing space is a positive integer and related to frame rate of playback of the stitched video frames; and sequentially obtaining each of the stitched video frames from the frame sharing space and playing each of obtained stitched video frames based on an order of the stitched video frames in the frame sharing space in response to storing the stitched video frames, wherein playing a $j^{th}$ stitched video frame in response to generating an $i^{th}$ stitched video frame, wherein i and j are positive integers, i is greater than or equal to k+j, i is accumulated in response to a next stitched video frame being generated, and k is number of the stitched video frames stored in the frame sharing space.

* * * * *